United States Patent Office 3,115,535
Patented Dec. 24, 1963

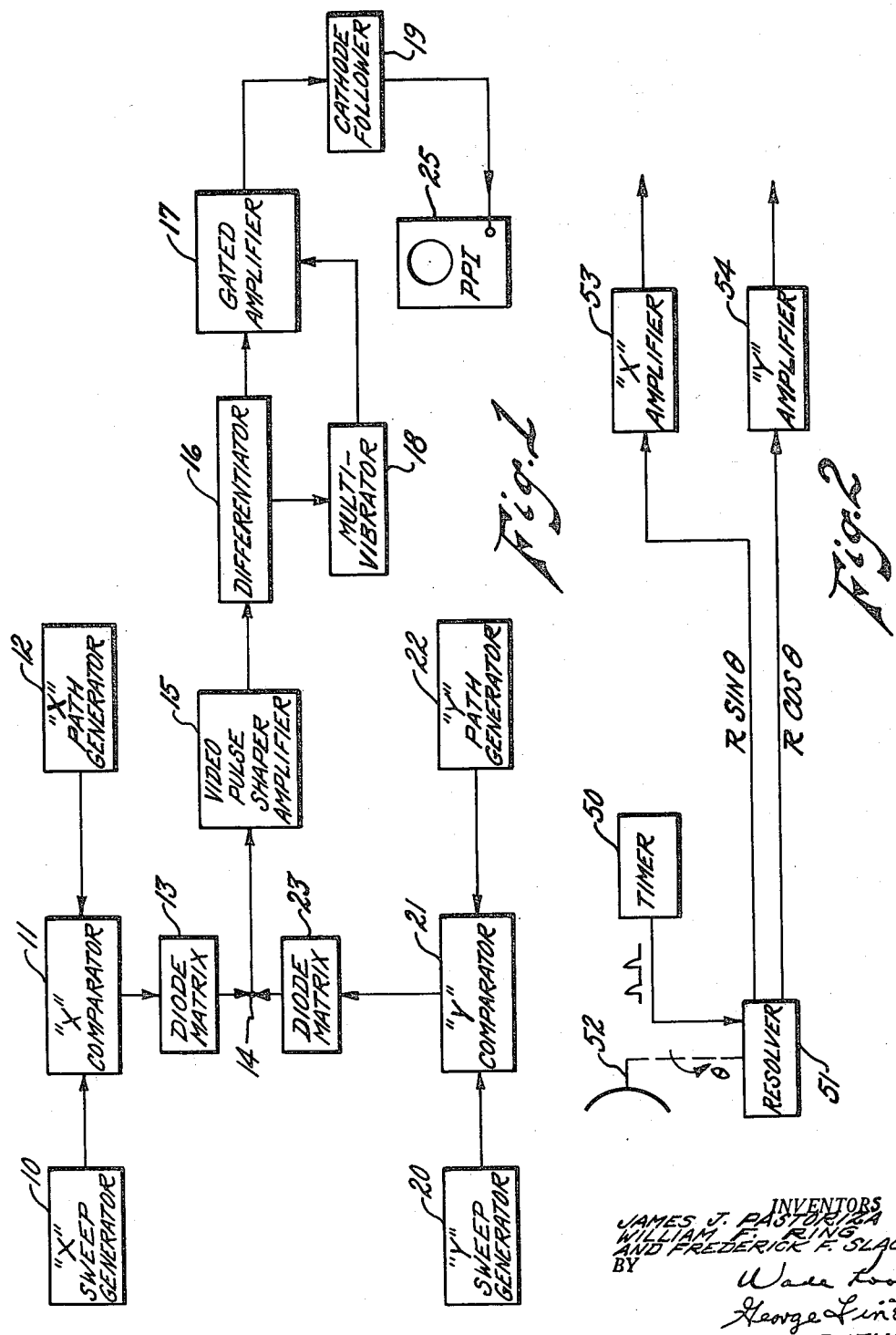

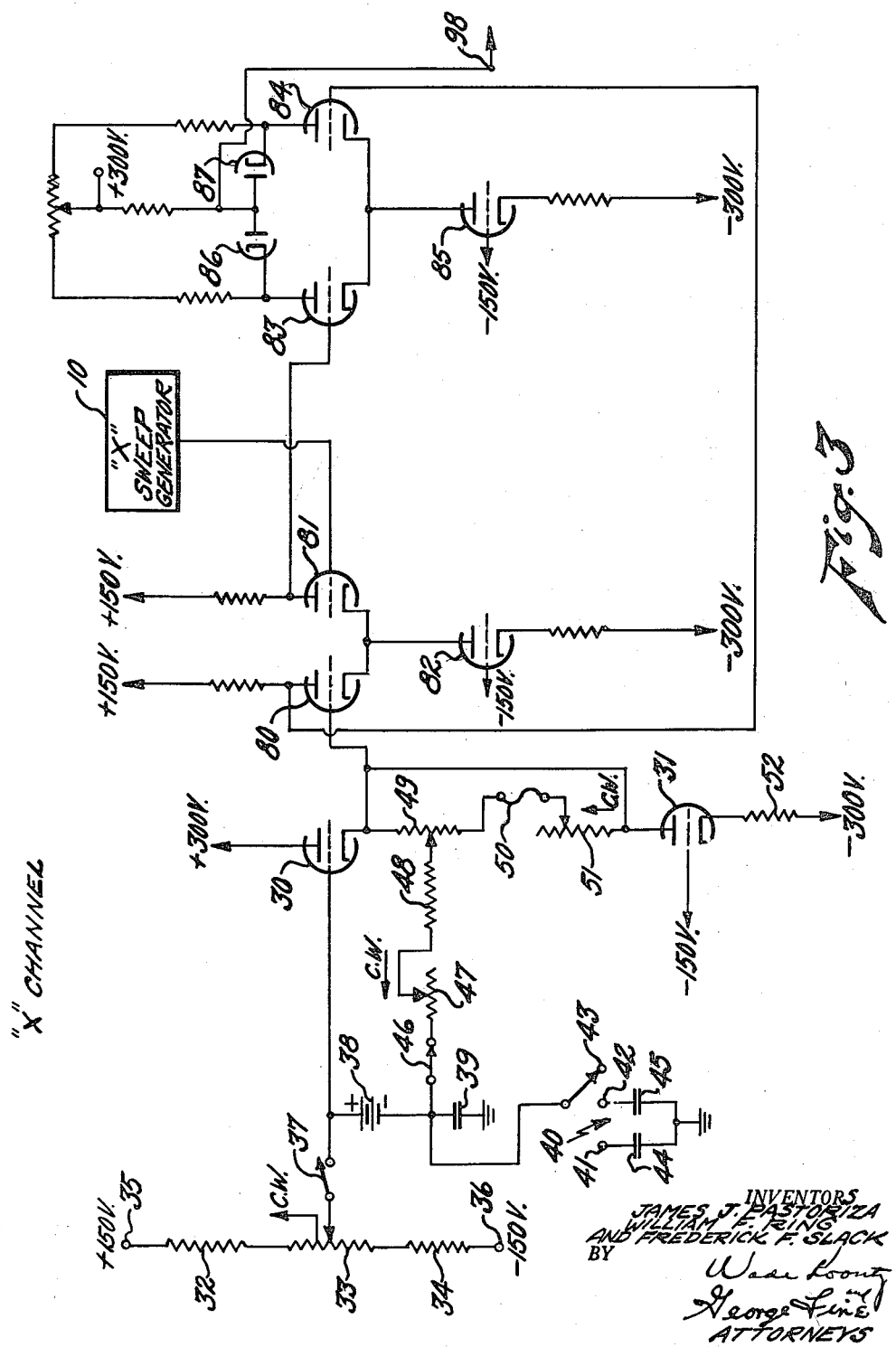

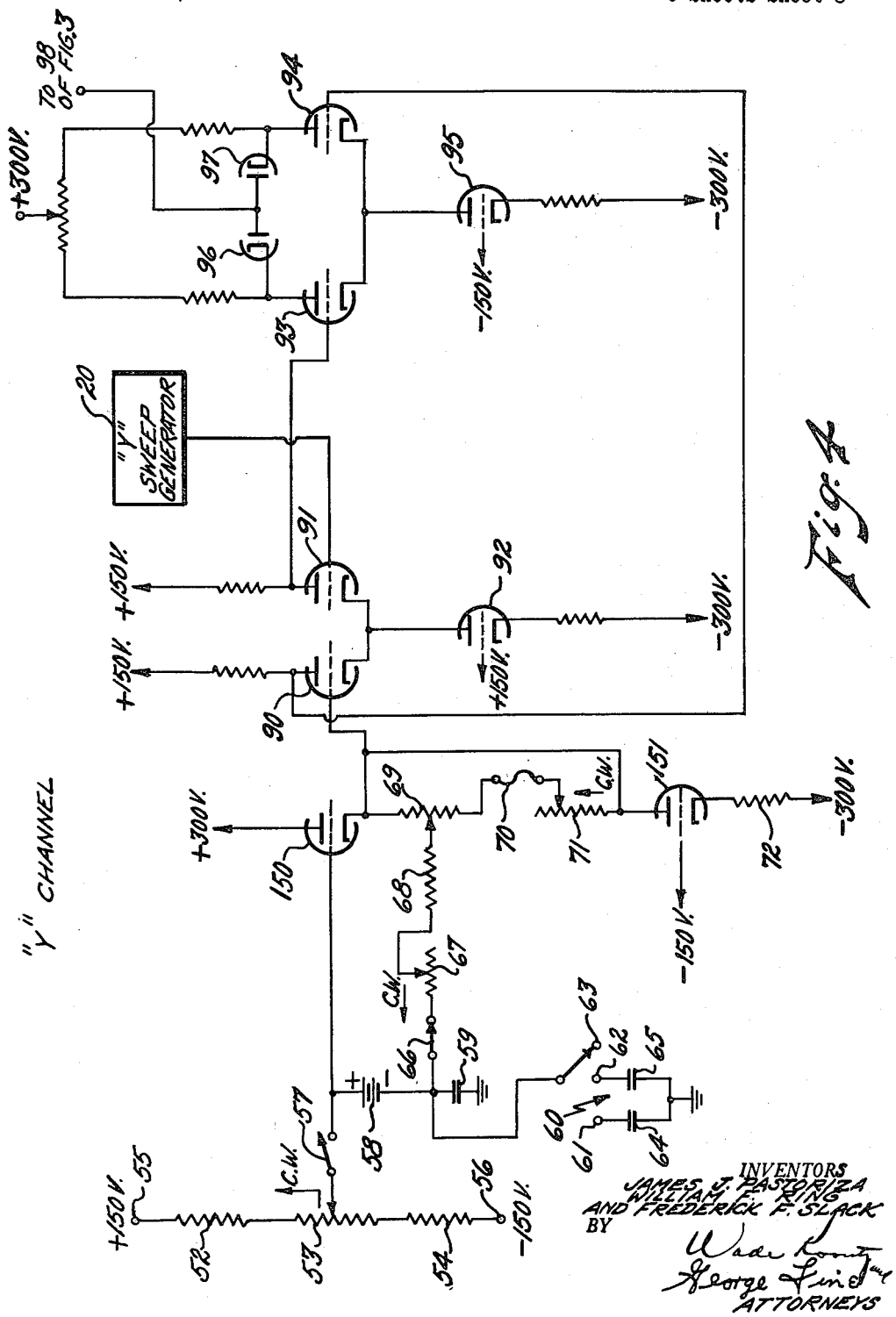

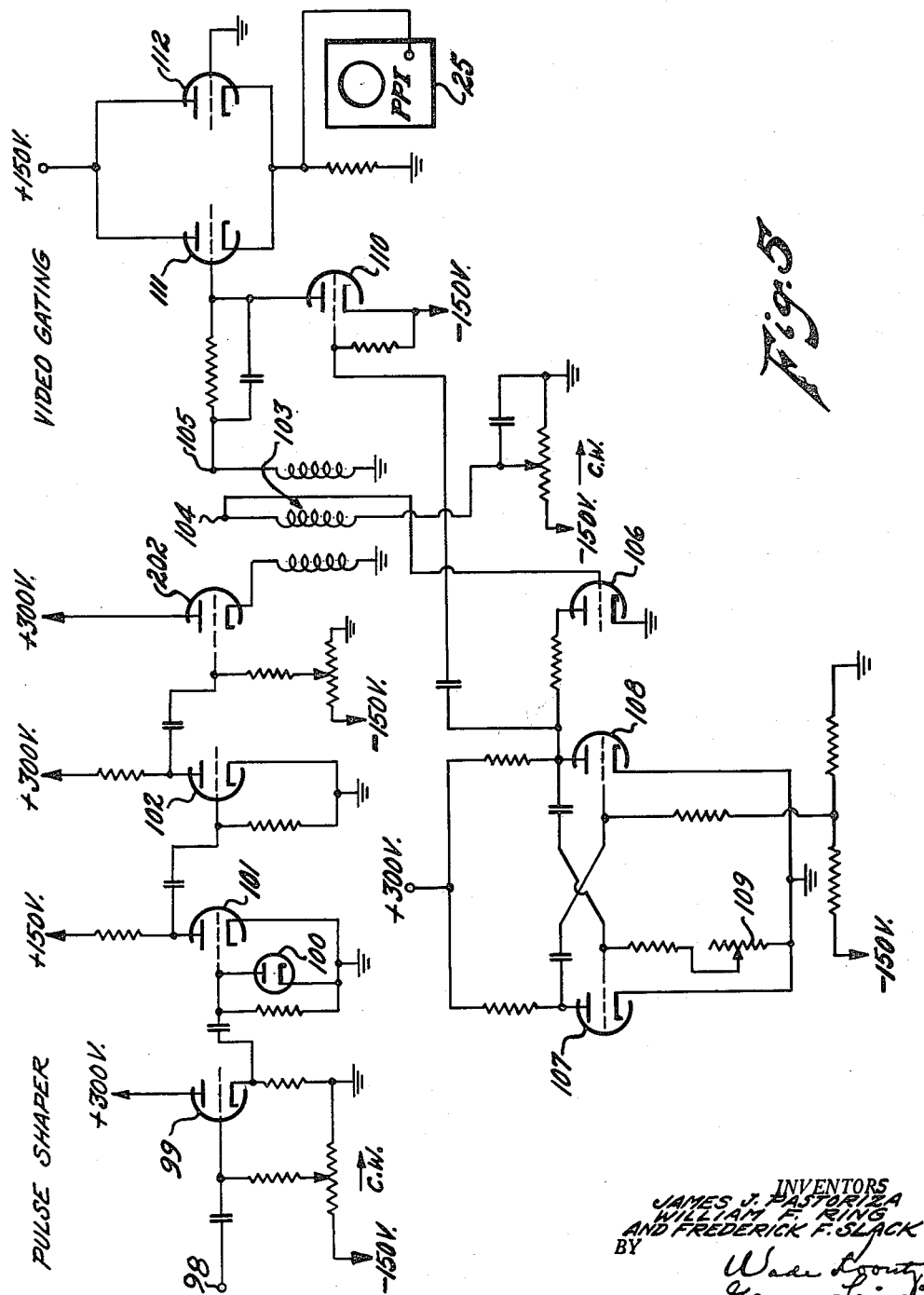

3,115,535
RADAR TARGET SIMULATOR
James J. Pastoriza, Boston, William F. Ring, Lexington, and Frederick F. Slack, Stoneham, Mass., assignors to the United States of America as represented by the Secretary of the Air Force
Filed Dec. 5, 1961, Ser. No. 157,283
3 Claims. (Cl. 35—10.4)
(Granted under Title 35, U.S. Code (1952), sec. 266)

The invention described herein may be manufactured and used by or for the United States Government for governmental purposes without payment to us of any royalty thereon.

This invention relates to a signal generator and more particularly to a generator wherein the signals generated have the general characteristics of the radar signals returned by a target aircraft in flight.

The signal generator of the present invention can be also referred to as a radar target simulator. The target simulator generates a video signal which has the general characteristics of the radar return signals representative of an aircraft in flight. The simulated radar signals are displayed on a plan position indicator (PPI) and are then utilized for training purposes.

An object of the present invention is to provide a target simulator wherein the simulated signals have the general characteristics of the radar return signals of an aircraft in flight.

Another object of the present invention is to provide a target simulator in which simulated signals are generated for visual presentation upon the face of a plan position indicator.

Still another object of the present invention is to provide a target simulator in which the simulated signals are representative of radar return signals of an airborne object as to heading, velocity, beamwidth and $x$ and $y$ coordinate positions.

These and other objects and advantages of this invention, which will be in part obvious and in part pointed out hereinafter, are obtained by the means described in the following specification, and may be more readily understood by reference to the accompanying drawings, showing one of the various possible embodiments of this invention, in which:

FIGURE 1 is a block diagram of the preferred embodiment of the present invention;

FIGURE 2 is a block diagram of the $x$ and $y$ generator shown in FIGURE 1;

FIGURE 3 is a diagram of the $x$ channel, FIGURE 1, partly in schematic and partly in block;

FIGURE 4 is a diagram of the $y$ channel of FIGURE 1 partly in schematic and partly in block form;

Figure 6:
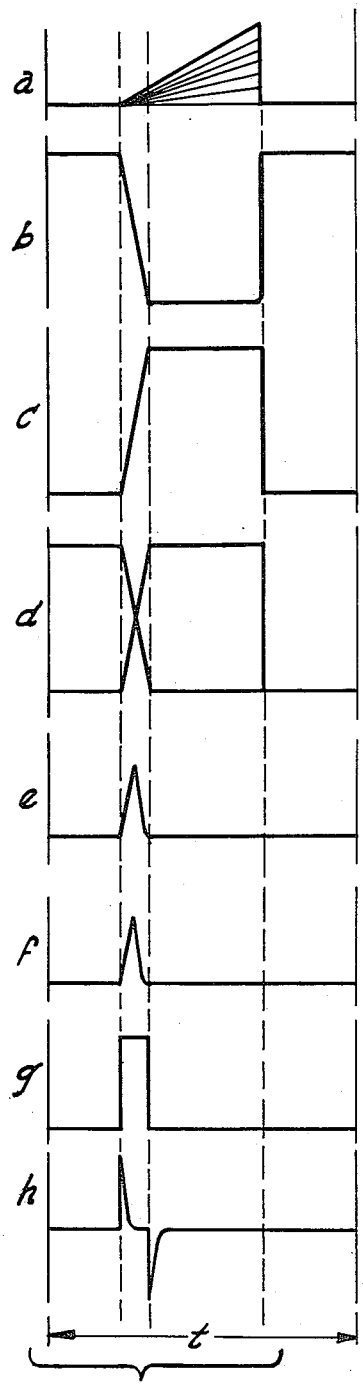
Figure 7:
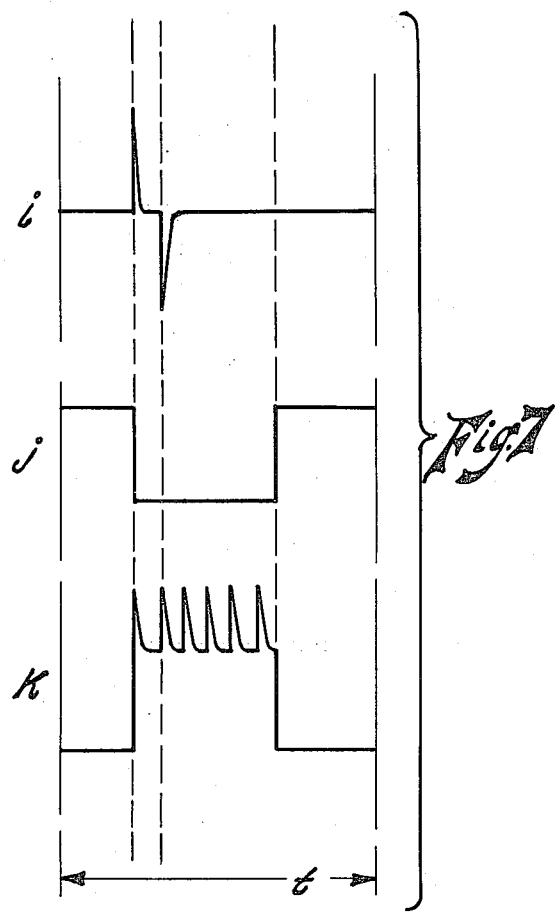

FIGURE 5 is the schematic diagram of components 15, 16, 17, 18 and 19 of FIGURE 1; and FIGURES 6 and 7 illustrate various pertinent waveforms of the preferred embodiment of the present invention.

Now referring in detail to FIGURE 1, there is shown $x$ sweep generator 10 and $y$ sweep generator 20, each of which provides a sawtooth voltage which continuously varies in amplitude from a maximum positive value to an identical maximum negative value. The $x$ and $y$ sawtooth waveforms are displaced from each other by 90°. These types of sawtooth waveforms are conventional in an electronic PPI scope, and is explained in detail hereinafter by referring to FIGURE 2 in which the $x$ and $y$ components are formed for an electronic PPI scope. The $x$ and $y$ components are formed by passing a sawtooth waveform from timer 50 through a sine, cosine resolver 51 connected to radar scanner 52, thereby producing two components of the same waveform but proportional respectively to the sine and cosine of the orientation angle of the resolver. The $x$ component may be passed through amplifier 53 and the $y$ component through amplifier 54. This is a conventional manner of generating $x$ and $y$ sawtooth waveforms for utilization in an electronic plan position indicator, and is shown and described on pages 26 through 28 of the Radiation Laboratory Series, vol. 22, entitled Cathode Ray Displays, published in 1948 by McGraw-Hill Book Company, Inc. It is to be noted that the above described generators of $x$ and $y$ sawtooth waveforms is commonly referred to as the "Resolved Time Base" Method of PPI synthesis and is more completely shown and described at pages 534–544 of vol. 1 of Radiation Laboratory Series entitled Radar System Engineering, published in 1947 by McGraw-Hill Company, Inc.

Now referring again to FIGURE 1, the $x$ sawtooth signal from generator 10 is fed to $x$ comparator 11 which simultaneously receives a D.C. signal from $x$ path generator 12. The $x$ path generator produces a direct current signal which is representative of the position heading and velocity of an aircraft in flight. Whenever coincidence in amplitude occurs in comparator 11, then amplification results therein and an output signal is provided therefrom to diode matrix 13. The $y$ channel comprising $y$ sweep generator 20, $y$ path generator 22, $y$ comparator 21 and diode matrix 23 operates in the identical fashion as the $x$ channel. X diode matrix 13 is interconnected with $y$ diode matrix 23 and a pulse is produced at point 14 only at the instant that $x$ D.C. position voltage is coincident with the $x$ sweep voltage and the $y$ D.C. position voltage is coincident with the $y$ sweep voltage. The pulses at point 14 are fed through video pulse shaper and amplifier 15 to differentiator 16. The differentiated signal is applied to normally non-conducting multivibrator 18. The first positive portion of the differentiated signal triggers multivibrator 18 and thereupon multivibrator 18 produces a pulse output with a preselected width which is applied to gate on amplifier 17. During the period amplifier 17 is gated on, only positive portions of the differentiated signal are amplified and pass to cathode follower 19. The preselected width of the output pulse from multivibrator 18 permits a simulation of radar beamwidth. The output pulses from cathode follower 19 are video in nature and are applied to the video signal input of electronic PPI scope 25 for visual presentation upon the face thereof.

Now referring to FIGURE 3, for a more detailed description of the mode of operation of the $x$ channel structure shown in FIGURE 1, $x$ path generator is comprised of vacuum tubes 30 and 31. The $y$ path generator is comprised of vacuum tubes 150 and 151, FIG. 4. Since the $x$ and $y$ channels are identical, only the $x$ channel is described. The $x$ path generator is an R.C. integrator which produces an $x$ position direct current voltage. Resistor 32 is connected in series with potentiometer 33 and resistor 34. At point 35 is connected a positive voltage source and at point 36, a negative voltage source. The movable arm of potentiometer 33 is connected by way of double pole-double throw position release switch 37 to the positive side of battery 38 and also to the grid electrode of vacuum tube 30. The negative side of battery 38 is connected to capacitor 39, two ganged speed range selector switch 40 and to dual, speed potentiometer 47 by way of double pole-single throw velocity release switch 46. The movable arm of potentiometer 47 is connected to the movable arm of dual-sine leading potentiometer 49 by way of resistor 48. One end of potentiometer 49 is connected to the cathode electrode of tube 30, the other end is connected by way of fuse 50 to the movable arm of potentiometer 51. It is to be noted that each of potentiometers 33, 47, and 51 has movable arms and the direction of their clockwise travel is represented by the legend C.W. as shown in FIGURE 3. The aforementioned C.W. legend is also associated with and identical in meaning for potentiometers 53, 67, and 71 of FIGURE 4. One end of potentiometer 51 is connected to the anode of tube 31. The grid of tube 31 is connected to 150 volt negative source and the cathode by way of resistor 52 to a −300 volt source of voltage. The anode of tube 30 is connected to a +300 volt source of voltage. Tube 31 serves as a constant current tube which produces a constant voltage across heading potentiometer 49. Linearity is provided through the bootstrap cathode follower 30. In the operation of the circuit comprised of tubes 30 and 31, the movable arm of potentiometer 33 is set to any desired point and switch 37 is closed momentarily. The adjustment of movable arm of potentiometer 33 permits the selection of D.C. voltage at the grid of tube 30 and this preselected voltage is representative of the initial $x$ position of the simulated target. The adjustment at potentiometer 53 of FIG. 4 operates in the same manner to select the initial $y$ position. Capacitor 39 receives a preselected charge by way of battery 38 and the rate of charge is determined by the setting of potentiometer 47. The direction of the charge is selected by potentiometer 49. It is thus seen that a D.C. voltage is then impressed upon the grid of tube 30. The initial value of the D.C. voltage is determined by the initial charge on capacitor 39 and is representative of the initial position of an aircraft target. The rate of charge as determined by potentiometer 47, is representative of the speed of the target and the setting of poentiometer 49 is representative of the heading thereof. There is also another adjustment provided which is comprised of switch 40 wherein capacitor 39 may be connected to ground alone or have paralleled therewith either capacitor 44 or 45. This provides a speed range selection. It is thus seen that there is available a D.C. voltage which is representative of a target having position, speed, and heading. It is to be noted that the $x$ path generator is identical to the $y$ path generator with the additional feature that position release switch 37 and 57 is comprised of a double pole-double throw switch; velocity switch 46 and 66 is comprised of a double pole-single throw switch; selector switch 40 is ganged to selector switch 60; speed potentiometer 47 is one part of a dual potentiometer with speed potentiometer 67 being the other portion thereof; and heading potentiometer 49 is a portion of a dual system with heading potentiometer 69.

The $x$ comparator is comprised of two differential amplifiers. The first differential amplifier is comprised of tubes 80, 81 and 82 and the second differential amplifier is comprised of tubes 83, 84 and 85. The varying D.C. voltage representative of $x$ target position, speed and heading is available at the cathode of tube 30 and is applied to the grid of tube 80. Simultaneously therewith, a varying sawtooth waveform as illustrated as waveform $a$ of FIGURE 6 is applied to the grid of tube 81 by way of $x$ sawtooth generator 10. Whenever a coincidence in amplitude occurs between aforesaid two input signals, amplification results and the anode of tube 80 has an output signal as illustrated as waveform $b$ in FIGURE 6 and the anode of tube 81 has an output signal shown as waveform $c$ of FIGURE 6. The output signal from tube 80 is applied to the grid of tube 84 and that of tube 81 to the grid of tube 83. The output signal of the anode of tube 83 is superimposed for illustration purposes on the output signal of the anode of tube 84 and is shown as waveform $d$ of FIGURE 6.

A diode matrix is provided comprised of diodes 86 and 87 wherein the anodes thereof are interconnected. The output signal of tube 83 is applied to the cathode of diode 86 and the output signal of tube 84 is applied to the cathode of diode 87. The output signal is provided by way of the aforesaid interconnected anodes and is shown as waveform $e$ of FIGURE 6. It is to be noted that the $y$ channel comparator operates in the identical manner and that the anodes of diode matrix of the $x$ comparator is interconnected with the anodes of the diode matrix of the $y$ comparator. The purpose of the diode output matrices is to produce a range pulse only at the instant that the $x$ D.C. position voltage is coincident with the $x$ sweep voltage and the $y$ D.C. voltage is coincident with the $y$ sweep voltage. This output pulse is available at point 98 and is illustrated as waveform $f$ of FIGURE 6. This pulse at that instant is representative of a return radar pulse of an airborne object in flight.

Now referring to FIGURE 5, the output pulse from point 98 is applied to pulse shaper and video amplifier which is comprised of tubes 99–102 and there is available at the grid of tube 102 a pulse illustrated in FIGURE 6 as waveform $g$. Tube 102 and transformer 103 serve as a differentiator and at points 104 and 105 there is provided an output signal as illustrated as waveform $h$ of FIGURE 6. The signal from point 104 is applied to the grid of amplifier tube 106 and the output signal therefrom is applied to multivibrator comprised of tubes 107 and 108. The positive portion of the differentiated and amplified signal (as shown as waveform $i$ of FIGURE 7) causes the multivibrator to provide a negative output pulse at the anode of tube 108. The width of the output pulse is determined by the setting of beamwidth potentiometer 109. The negative output pulse is illustrated as waveform $j$ of FIGURE 7. This beamwidth output pulse is applied to the grid of tube 110. Tube 110 is normally conductive and because of the operating potentials applied thereto the positive portions of the differentiated signals cannot be applied to the grid of tube 111. When the negative pulse is applied to the grid of tube 110, amplification of the positive portions of the differentiated signals from point 105 occurs and the signal input at the grid of tube 111 is illustrated as waveform $k$ of FIGURE 7. It is seen that effectively tube 110 is a gated amplifier and provides a pulse output during the period a negative pulse is applied to the grid thereof. Thus, the number of pulses that is amplified is representative of the beamwidth, and the beamwidth simulation is varied by potentiometer 109. The pulse output is in the form of video and is available from the interconnected cathodes of tubes 111 and 112. The video pulse output is applied to the conventional video input terminal of an electronic PPI scope such as PPI scope 25 and the pulses appear on the face of the PPI scope for visual presentation. There is thus provided a target simulator which can provide video signals for visual display on the face of a PPI scope in which the simulated signals have all the general characteristics of the return radar signals provided by an airborne object in flight. These aforementioned characteristics include initial position of the airborne object, its heading and speed, also the beamwidth of the radar that is looking at the airborne object.

What is claimed is:

1. A target simulator generating signals having the general characteristics of the radar return signals of an airborne object in flight comprising means to generate $x$ and $y$ sawtooth waveforms, each of said waveforms varying continuously from a maximum positive value to the identical maximum negative value, said $y$ sawtooth waveform being displaced by 90° from said $x$ sawtooth waveform, means to generate $x$ and $y$ coordinate direct current signals, each of said signals being representative of the initial position, heading and speed of an airborne object in flight, first comparison means to compare the amplitude of said $x$ D.C. voltage to the amplitude of said $x$ sawtooth voltage, second comparison means to compare the amplitude of said $y$ D.C. voltage to the amplitude of said $y$ sawtooth voltage, diode means interconnecting said first and second comparison means and operating to pass a pulse only at the instant that $x$ D.C. position voltage coincides with said $x$ sawtooth waveform voltage and the $y$ D.C. position voltage coincides with the $y$ sawtooth waveform voltage, a normally non-conducting multivibrator receiving and actuated by said passed pulse and operating to provide an output pulse therefrom of preselected width to simulate radar beamwidth, an amplifier gated on for the period of said multivibrator output pulse and amplifying said passed pulses during said gated on period, and means to display on the face of a plan position indicator said passed pulses, the number of said passed pulses being representative of said radar beamwidth.

2. A target simulator generating signals having the general characteristics of the radar return signals of an airborne object in flight comprising means to generate sawtooth waveforms representative of the $x$ coordinates of said airborne object in flight, means to generate sawtooth waveforms representative of the $y$ coordinates of said airborne object in flight, means to generate a direct current voltage representative of said $x$ coordinate position, heading and speed of said airborne object in flight, means to generate a direct current voltage representative of said $y$ coordinate position of said airborne object in flight, first means to compare the amplitude of said $x$ direct current voltages to the amplitude of said $x$ sawtooth waveforms, second means to compare the amplitude of said $y$ direct current voltages to the amplitude of said $y$ sawtooth waveforms, diode means interconnecting said first and second comparison means and operating to pass a pulse only at the instant the $x$ direct current position voltage coincides with the $x$ sawtooth waveform voltage and the $y$ direct current voltage coincides with the $y$ sawtooth waveform voltage, and means to display visually on the face of a plan position indicator a preselected number of said passed pulses.

3. A target simulator as described in claim 2 wherein means to visually display a preselected number of said passed pulses includes a normally non-conducting multivibrator receiving and being actuated by said passed pulse to produce an output pulse therefrom of a preselected width to simulate radar beamwidth, an amplifier gated on for the period of said multivibrator output pulse and amplifying said passed pulses during said gated on period, the number of said passed pulses being representative of said radar beamwidth.

References Cited in the file of this patent
UNITED STATES PATENTS

| 2,674,812 | Hales | Apr. 13, 1954 |
| 2,951,297 | Colker | Sept. 6, 1960 |